(12) United States Patent
Baker et al.

(10) Patent No.: US 6,245,282 B1
(45) Date of Patent: Jun. 12, 2001

(54) APPARATUS AND METHOD FOR FORMING FIBERS FROM THERMOPLASTIC FIBERIZABLE MATERIALS

(75) Inventors: John Wayne Baker, Lone Tree, CO (US); Rodney Roger Smalley, Wayne, IN (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/369,669

(22) Filed: Aug. 5, 1999

(51) Int. Cl.[7] .............................. C03B 37/04; D01D 5/18
(52) U.S. Cl. .............................. 264/555; 65/461; 65/523; 65/524; 264/211.1; 264/211.11; 425/72.2
(58) Field of Search .......................... 264/211.1, 211.11, 264/555; 425/72.2; 65/461, 523, 524

(56) References Cited

U.S. PATENT DOCUMENTS 5,688,302 * 11/1997 Snyder ................................. 65/461

* cited by examiner

Primary Examiner—Leo B. Tentoni

(74) Attorney, Agent, or Firm—John D. Lister

(57) ABSTRACT

Fibers are produced a from molten thermoplastic fiberizable material in a rotary fiberizing process by passing the fiberizable material through rows of fiberizing holes in an annular sidewall of a fiberizing disk. A first manifold supplies a combustible gas or gaseous mixture into the fiberizing disk where the combustible gas or gaseous mixture combusts to help maintain the fiberizing disk and the molten fiberizable material supplied to the fiberizing disk within a desired temperature range for fiberization. A second manifold supplies a combustible gas or gaseous mixture externally of the fiberizing disk where the combustible gas or gaseous mixture combusts. The products of combustion from the burning of the combustible gases or gaseous mixtures discharged from the first and second manifolds heat an annular fiber attenuation zone surrounding the disk sidewall and help attenuate fibers in the heated attenuation zone. A gaseous fluid discharge ring concentrically positioned relative the fiberizing disk discharges a high velocity annular curtain of gaseous fluid to help attenuate fibers in the heated attenuation zone and redirect the fibers for collection. Preferably, the diameters of the fiberizing holes decrease from an uppermost row to a lowermost row to decrease the mass flow rate of fiberizable material through the fiberizing holes as the momentum of the combustion products and the gaseous fluid curtain pulling on the fibers decreases.

29 Claims, 2 Drawing Sheets

APPARATUS AND METHOD FOR FORMING FIBERS FROM THERMOPLASTIC FIBERIZABLE MATERIALS

BACKGROUND OF THE INVENTION

The present invention relates to an apparatus and method for forming fibers from molten thermoplastic fiberizable materials, and in particular, to an apparatus and method for forming fibers from molten thermoplastic fiberizable materials which improves the physical characteristics of the fibers produced and the integrity of blankets formed from the fibers.

Rotary fiberizing processes typically include a rotating fiberizing disk with an annular peripheral sidewall containing rows of fiberizing holes. The rotating fiberizing disk is supplied by a stream of hot molten thermoplastic fiberizable material, such as but not limited to glass, which is deposited on a bottom wall of the fiberizing disk inwardly of the disk sidewall. The centrifugal force produced by the rotation of the fiberizing disk causes the hot, molten fiberizable material to flow across the bottom wall of the fiberizing disk and up the disk sidewall where the hot, molten fiberizable material passes out through the fiberizing orifices to form fibers.

In a first form of the process, an annular combustion burner is located concentrically relative to the fiberizing disk which is typically about 12 inches to about 18 inches in diameter. The annular combustion burner discharges hot, high velocity combustion gases from its internal combustion chamber downward into an annular region adjacent and surrounding the disk sidewall to form a heated fiber attenuation zone for attenuating fibers issuing generally horizontally from the fiberizing holes in the disk sidewall. At and adjacent the uppermost row of fiberizing holes in the fiberizing disk sidewall, the velocity of the combustion gases of the hot, high velocity annular flame typically ranges from about 500 feet per second to about 700 feet per second. These hot, high velocity combustion gases a) envelope the fibers as the fibers issue from the fiberizing orifices to maintain the fibers issuing from the fiberizing holes in a softened state as the fibers pass through the heated fiber attenuation zone; b) pull on the fibers issuing from the fiberizing holes to attenuate the fibers as the fibers pass through the heated fiber attenuation zone; and c) redirect the fibers downward. After the redirected fibers pass from the heated attenuation zone, the fibers solidify and are collected. Typically, the energy input at the fiberizer required by this process to produce one pound of glass fibers (the energy from the molten glass and the attenuating flame of the external attenuation burner) ranges from about 2500 to about 3300 British Thermal Units (BTU's).

In a second form of the process, a manifold delivers an air/gas mixture (typically an air/natural gas mixture) internally of the fiberizing disk and an annular air ring is located concentrically relative to and spaced outwardly from the fiberizing disk. In this form of the process the fiberizing disk is typically about 15 inches to about 30 inches in diameter. The air/gas mixture, introduced into the fiberizing disk, is gas rich (fuel rich) whereby the air/gas mixture not only combusts within the fiberizing disk but unburned gas from the mixture spills over the outer rim and passes generally downward along the peripheral sidewall of the fiberizing disk where the gas burns adjacent the sidewall and forms a heated fiber attenuation zone adjacent and surrounding the fiberizing disk sidewall. Thus, the combustion of the air/gas mixture introduced into the fiberizing disk, within the fiberizing disk, maintains the fiberizing disk and the molten fiberizable material within the fiberizing disk within a selected or desired temperature range for fiberization and the combustion of the unburned gas spillover from the air/gas mixture adjacent and surrounding the disk sidewall produces a heated fiber attenuation zone where fibers issuing generally horizontally from the fiberizing holes in the disk sidewall are attenuated. At and adjacent the uppermost row of fiberizing holes in the fiberizing disk sidewall, the velocity of the combustion products from the combustion of the fuel spillover typically ranges from about 20 feet per second to about 50 feet per second. The air ring discharges a high velocity (typically about 1,000 feet per second and higher) curtain of air in a downward direction to pull on and attenuate the fibers as the fibers pass through the heated fiber attenuation zone and solidify and redirect the fibers downward for collection after the fibers have passed through the heated fiber attenuation zone. Typically, the energy input at the fiberizer required by this process to produce one pound of glass fibers (the energy from the molten glass, from the combustion of the air/gas mixture within the fiberizing disk, from the combustion of the gas spillover, and from air curtain) ranges from about 1,000 to about 1,700 British Thermal Units (BTU's).

While both of these processes are in commercial use and function quite satisfactorily to produce commercially acceptable grades of fibers (e.g. glass fibers), there has remained a need to produce fibers of equal or better quality at energy consumptions equaling or approximating the energy consumption of the second process rather than the first process discussed above e.g. energy consumptions of about 1,000 to about 1700 BTU's per pound of glass fibers produced vs energy consumptions of about 2,500 to about 3,300 BTU's per pound of glass fibers produced.

SUMMARY OF THE INVENTION

In the method and apparatus of the present invention, fibers are produced from a molten thermoplastic fiberizable material, such as but not limited to glass, in a rotary fiberizing process by passing the fiberizable material through rows of fiberizing holes in an annular sidewall of a fiberizing disk. A first manifold supplies a first combustible gas or gaseous mixture (normally an air/natural gas mixture or air/propane gas mixture) into the fiberizing disk where the combustible gas or gaseous mixture combusts, externally of the manifold, to help maintain the fiberizing disk and the molten fiberizable material supplied to the fiberizing disk within a desired temperature range for fiberization. Simultaneously and, preferably, independently of the first manifold, a second manifold supplies a second combustible gas or gaseous mixture (normally an air/natural gas mixture or air/propane gas mixture) externally of the fiberizing disk where the combustible gas or gaseous mixture combusts, externally of the second manifold and the fiberizing disk. The combustion products from the combustion of the combustible gas or gaseous mixture from the second manifold, together with combustion products from the combustible gas or gaseous mixture from the first manifold that pass out over an upper rim of the fiberizing disk, form an annular curtain of combustion products and a heated annular fiber attenuation zone surrounding the fiberizing disk sidewall. At and adjacent the uppermost row of fiberizing holes in the fiberizing disk sidewall, the velocity of the annular curtain of combustion products, formed from the combustion of the combustible gases or gaseous mixtures discharged from the first and second manifolds, typically ranges from about 60 feet per second to about 400 feet per second and preferably, from about 100 feet per second to about 200 feet per second.

A gaseous fluid discharge ring, e.g. an air, steam, air/combustible gas or combustible gas discharge ring, but preferably, an air discharge ring concentrically positioned relative the fiberizing disk and spaced outwardly from the disk sidewall discharges a high velocity (typically, about 1,000 feet per second and higher) annular curtain of gaseous fluid (preferably air) in a downward direction to pull on and attenuate the fibers as the fibers pass through the heated attenuation zone. Preferably, the temperature of the annular curtain of gaseous fluid from the gas discharge ring, such as when air is used, helps to solidify the fibers. In addition, the annular curtain of gaseous fluid redirects the fibers downward for collection after the fibers have passed through the heated fiber attenuation zone.

Preferably, the diameters of the fiberizing holes in the fiberizing disk decrease from an uppermost row to a lowermost row to decrease the mass flow rate of fiberizable material through the fiberizing holes as the momentum of the attenuating forces from the combustion products and the gaseous fluid curtain acting on the fibers decreases.

With the method and apparatus of the present invention, favorable improvements in one or more of the following fiber characteristics can be demonstrated relative to the first and second processes discussed in the background of the invention: lower mean fiber diameter, narrower fiber diameter distribution, increased fiber length, cleanliness (low dust) and possible improvements in fiber surface chemistry. Insulation blankets of randomly oriented fibers, made from the fibers produced by the method and apparatus of the present invention can exhibit better integrity (recovery in thickness from compression, droop, and tensile strengths) without sacrificing thermal performance. In addition, NOx, CO, total hydrocarbon and methane gas concentrations are significantly reduced in the emissions from the process of the present invention when compared to the second process discussed above in the background of the invention.

DESCRIPTION OF THE PREFERRED EMBODIMENTS

Figure 1:
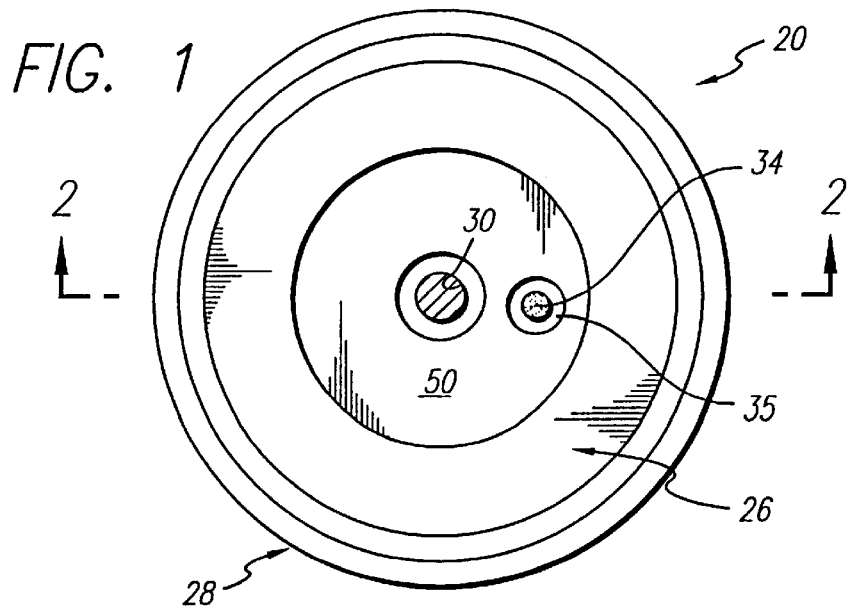
FIG. 1 is a schematic top view of the apparatus of the present invention for producing fibers from molten thermoplastic fiberizable materials by the method of the present invention.
Figure 2:
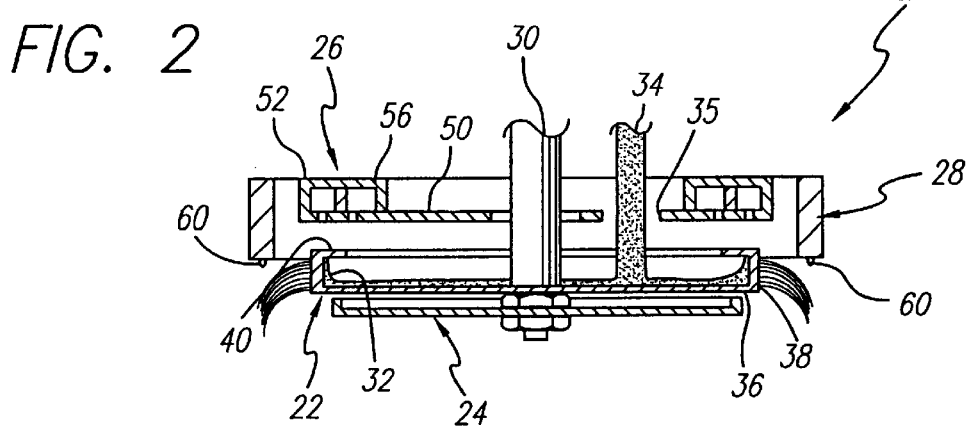
FIG. 2 is a schematic transverse vertical cross section through the apparatus of FIG. 1 taken substantially along lines 2—2 of FIG. 1.
Figure 3:
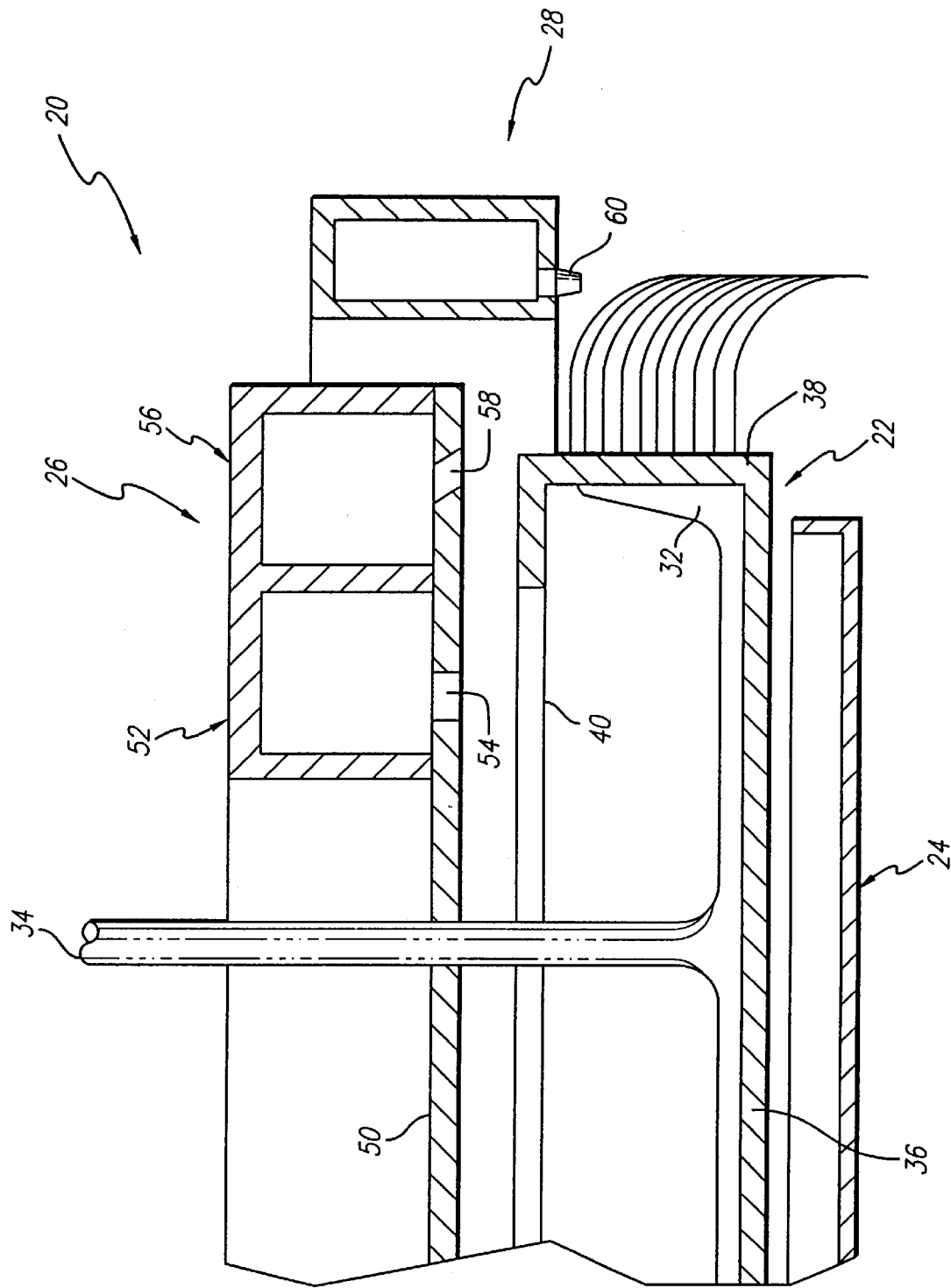
FIG. 3 is an enlarged schematic of a portion of the transverse vertical cross section of FIG. 2.

As schematically shown in FIGS. 1–3, the apparatus 20 of the present invention for forming fibers from thermoplastic fiberizable materials includes: a fiberizing disk 22; an insulator plate 24; a dual manifold assembly 26 for supplying combustible gases or gaseous mixtures internally and externally of the fiberizing disk 22; and a gaseous fluid discharge ring assembly 28 for forming an annular gaseous fluid curtain around and spaced outwardly from the fiberizing disk 22. The apparatus has a drive assembly (not shown) for rotating the shaft 30 and consequently, the fiberizing disk 22 at thousands of revolutions per minute and is typically located in a collection chamber where the fibers produced by the apparatus 20 are collected on a moving conveyor to form a blanket of randomly oriented fibers.

The apparatus forms fibers from molten thermoplastic fiberizable materials, such as but not limited to glass, which are heated to a molten state in a furnace or melter and introduced into the interior of the fiberizing disk 22. As shown, the molten fiberizable material 32 is introduced into the interior of the fiberizing disk 22 as a stream 34 of the molten thermoplastic fiberizaable material 32 which passes through an opening 35 in the dual manifold assembly.

The fiberizing disk 22 is made of a high temperature resistant alloy and includes a bottom wall 36 and an integral annular peripheral sidewall 38 that extends upward from the periphery of the bottom wall at substantially right angles. The annular sidewall 38 has an integral annular reinforcing flange or rim 40 extending inwardly from the upper edge of the sidewall to reinforce the sidewall. The insulator plate 24 is secured to shaft 30 adjacent the underside of the bottom wall 36 of the fiberizing disk 22 and rotates with the fiberizing disk. The insulator plate 24 helps maintain the fiberizing disk 22 and the molten fiberizable material 32 within the fiberizing disk within a desired temperature range for fiberization.

The peripheral sidewall 38 of the fiberizing disk 22 is provided with numerous fiberizing holes 42 (typically thousands to tens of thousands of fiberizing holes) which are arranged in a plurality of horizontally extending annular rows around the circumference of the sidewall 38. The fiberizing holes are small in diameter, typically, having diameters between 0.010 And 0.030 inches. In operation, the centrifugal forces generated by the rotation of the fiberizing disk 22 cause the molten fiberizable material within the fiberizing disk 22 to flow outward and up the sidewall 38 where the molten fiberizable material flows out through the fiberizing holes to form fibers.

Figure 4:
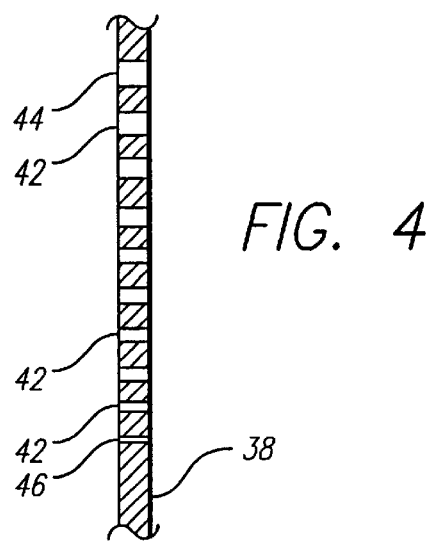
FIG. 4 is a partial vertical cross section through a fiberizing disk sidewall to schematically show the fiberizing holes in the fiberizing disk sidewall.

While the diameters of the fiberizing holes 42 in the different rows of fiberizing holes can be the same, preferably, as schematically shown in FIG. 4, the diameters of the fiberizing holes 42 differ with the fiberizing holes being largest in diameter in the uppermost row 44 and decreasing in diameter on downward to the lowermost row 46 which has the smallest diameter fiberizing holes. The mass flow rate of the thermoplastic fiberizable material (e.g. glass) passing through different fiberizing holes in the fiberizing disk is affected by the size of the hole (the hole diameter) and the relative viscosity of the thermoplastic fiberizable material passing through the fiberizing hole. Since the temperature of the thermoplastic fiberizable material affects its viscosity and the thermoplastic fiberizable material is hotter adjacent to the uppermost rows of fiberizing holes in the fiberizing disk than adjacent to the lowermost rows of fiberizing holes in the fiberizing disk, the temperature of and hence the viscosity of the thermoplastic fiberizable material passing through a fiberizing hole is taken into account in determining the size of the fiberizing holes 42 and the mass flow rate of fiberizable material passing through the fiberizing holes 42 in a particular row of fiberizing holes.

Preferably, the diameters of the fiberizing holes 42 from the uppermost row 44 to the lowermost row 46 are decreased, taking into account the differing viscosity of the thermoplastic fiberizable material at different row heights, so that a decrease in the mass flow rate of the thermoplastic fiberizable material per fiberizing hole in a particular row relative to the mass flow rate per fiberizing hole in the uppermost row 44 corresponds generally to a decrease in momentum of the fiber attenuation forces from the combustion products and the annular gaseous fluid curtain (preferably, an air curtain) at a height of the particular row to the momentum of the fiber attenuation forces from the combustion products and the annular gaseous fluid curtain (preferably, an air curtain) at a height of the uppermost row 44.

Preferably, the dual manifold assembly 26 for supplying combustible gases or gaseous mixtures both internally and externally of the fiberizing disk 22 are made of a high temperature resistant alloy and are integral with the upper heat shield 50 that overlies the fiberizing disk 22. The dual manifold assembly 26 includes a first annular manifold 52 and a second annular manifold 56. Neither manifold has an internal combustion chamber and the combustible gases or gaseous mixtures supplied by these manifolds burns externally of the manifolds rather than within the manifolds.

Preferably, the first annular manifold 52 is supplied with a combustible gaseous mixture (e.g. air/natural gas or air/propane gas) from a first air/gas premix system and the second annular manifold 56 is supplied with a combustible gaseous mixture (e.g. air/natural gas or air/propane gas) from a second air/gas premix system that is independent of the first air/gas premix system. With this arrangement, the volumes, velocities and air/gas ratios of the air/gas mixtures supplied to the first and second manifolds 52 and 56 can be regulated independently of each other for more effective and efficient fiberization. While it is preferred to supply combustible air/natural gas or air/propane gas mixtures to the first and second manifolds 52 and 56, other combustible gases can be used, such as but not limited to, oxygen/natural gas mixtures, oxygen/propane gas mixtures, or other combustible gases or gaseous mixtures.

The first annular manifold 52 has an annular discharge slot or an annular series of spaced apart discharge orifices 54 for supplying a combustible gas or gaseous mixture internally of the fiberizing disk 22. The combustible gas or gaseous mixture directed into the interior of the fiberizing disk 22, combusts externally of the manifold and within the fiberizing disk to heat both the fiberizing disk and the molten fiberizable material 32 within the fiberizing disk and maintain the fiberizing disk and the molten fiberizable material within the fiberizing disk within a desired temperature range for fiberization. Any unburned combustible gas from the combustible gas or gaseous mixture discharged into the interior of the fiberizing disk from the first manifold is burned along with the combustible gas or gaseous mixture from the second manifold 56 as the products of combustion from the combustion of the combustible gas or gaseous mixture discharged from the first manifold pass out over the rim 40 of the fiberizing disk 22.

The second annular manifold 56 has an annular discharge slot or an annular series of spaced apart discharge orifices 58 for supplying a combustible gas or gaseous mixture externally of the fiberizing disk 22. While the discharge slot or orifices 58 can be directed vertically, preferably, as shown in FIG. 3, the discharge slot or orifices are directed downward and outward (e.g. at an angle of about 25° to about 35°) to better discharge the combustible gas or gaseous mixture from the second annular manifold 56 over the reinforcing rim or flange 40 and down along and adjacent the outer surface of the fiberizing disk sidewall 38. The combustible gas or gaseous mixture from the second manifold 56 combusts, externally of the second manifold, in the annular region below the discharge slot or orifices 58 and adjacent the outer surface of the fiberizing disk sidewall 38 to create, together with the combustion products from the combustible gas or gaseous mixture from the first manifold that pass out over the upper rim 40 of the fiberizing disk, a heated fiber attenuation zone. The heated fiber attenuation zone extends from immediately above the uppermost row 44 of fiberizing holes down to immediately below the lowermost row 46 of fiberizing holes and from the outer surface of the fiberizing disk sidewall to the annular curtain of gaseous fluids discharged from the gaseous fluid discharge ring assembly 28. The velocity of the annular curtain of combustion products, formed from the combustion of the combustible gases or gaseous mixtures discharged from the first and second manifolds 52 and 56, as the combustion products enter the heated fiber attenuation zone, typically ranges from about 60 feet per second to about 400 feet per second and, preferably, from about 100 feet per second to about 200 feet per second.

While in a preferred embodiment of the invention, the first and second manifolds 52 and 56 are integral with the heat shield 50, one or both of the manifolds can be separate from the heat shield 50. For example, the first manifold 52 can be integral with the heat shield 50 and the second manifold 56 can be integral with the gaseous fluid discharge ring assembly 28; the first manifold 52 can be integral with the heat shield 50 and the second manifold 56 can be separate from both the heat shield 50 and the gaseous fluid discharge ring assembly 28; or the first and second manifolds 52 and 56 can be separate from each other, the heat shield 50 and the gaseous fluid discharge ring assembly 28. In addition, while it is preferred to have independent combustible gas or gaseous mixture delivery systems for the first and second manifolds 52 and 56, for some applications, the first and second manifolds 52 and 56 could be supplied from the same combustible gas or gaseous mixture delivery system.

The gaseous fluid discharge ring assembly 28 is made of a high temperature resistant alloy and is concentrically positioned relative to the fiberizing disk 22 and spaced outwardly from the disk sidewall. The gaseous fluid discharge ring assembly 28 is supplied with a pressurized gaseous fluid, preferably air, and discharges a high velocity annular curtain of gaseous fluid from an annular slot or preferably, an annular series of nozzles 60. Typically, the velocity of the gaseous fluid streams in the curtain of gaseous fluid is about 1,000 feet per second and higher at the level of the uppermost row of fiberizing holes. The annular curtain of gaseous fluid is spaced outwardly from the sidewall 38 of the fiberizing disk from about 0.75 to about 1.25 inches and is discharged in a downward direction from a height equal to or preferably immediately above the level of the uppermost row of fiberizing holes 44 to pull on and attenuate the fibers as the fibers pass through the heated fiber attenuation zone. Preferably, the annular curtain of gaseous fluid from the gaseous fluid discharge ring also solidifies the fibers and redirects the fibers downward for collection after the fibers have passed through the heated fiber attenuation zone. While air is the preferred gaseous fluid, the gaseous fluid can be steam, air/natural gas, a combustible gas, or other gaseous fluids.

The production rates for the method of the present invention typically range from about 1,000 pounds per hour to over 2,000 pounds per hour. In the method of the present invention, a stream 34 of hot, molten thermoplastic fiberizable material 32, such as but not limited to glass, is introduced into the interior of the rotating fiberizing disk 22. Once the molten fiberizable material 32 is introduced into the rapidly rotating fiberizing disk 22, the centrifugal force generated by the rapidly rotating fiberizing disk 22 causes the molten fiberizable material 32 to flow outward across the bottom wall 36 of the fiberizing disk and up the sidewall 38 of the fiberizing disk where the molten fiberizable material passes through the fiberizing holes 42 in the sidewall 38 to form fibers. A first combustible gas or gaseous mixture is introduced into the interior of the fiberizing disk 22 from the discharge slot or orifices 54 of the first manifold 52. The combustible gas or gaseous mixture discharged from the slot or orifices 54 combusts externally of the first manifold 52 and within the fiberizing disk 22 to heat both the fiberizing disk and the molten fiberizable material 32 within the fiberizing disk and maintain the fiberizing disk and the molten fiberizable material within the fiberizing disk within a desired temperature range for fiberization.

A second combustible gas or gaseous mixture is introduced, simultaneously with and, preferably, independently of the first combustible gas or gaseous mixture, into an annular region externally of the fiberizing disk 22 from the discharge slot or orifices 58 of the second manifold 56. This combustible gas or gaseous mixture combusts externally of the second manifold 56, in the annular region below the discharge slot or orifices 58 and adjacent the outer surface of the fiberizing disk sidewall 38. The combustion products from the combustion of the combustible gases or gaseous mixtures from the first and second manifolds, create the heated fiber attenuation zone. The heated fiber attenuation zone extends from immediately above the uppermost row 44 of fiberizing orifices down to immediately below the lowermost row 46 of fiberizing orifices and from the outer surface of the fiberizing disk sidewall to the annular curtain of gaseous fluid (preferably air) discharged from the gaseous fluid discharge ring assembly 28. The velocity of the annular curtain of combustion products, formed from the combustion of the combustible gases or gaseous mixtures discharged from the first and second manifolds 52 and 56, as the combustion products enter the heated fiber attenuation zone, typically ranges in velocity from about 60 feet per second to about 400 feet per second; and preferably, in velocity from about 100 feet per second to about 200 feet per second. The increase in velocity of the annular curtain of combustion products in the method of the present invention relative to the velocity of the combustion products from the gas or fuel spillover of the second process, discussed above in the background of the invention, is believed to enhance the formation of longer, finer fibers by the method of the present invention.

The total BTU's of energy consumed by the combustion of the combustible gases or gaseous mixtures from the first and second manifolds 52 and 56 per pound of fiberizable material 32 fiberized are substantially equal to the BTU's of energy consumed by the second process discussed above in the background of the invention per pound of fiberizable material fiberized. When making glass fibers by either the second process discussed above in the background of the invention or the method of the present invention, the BTU's consumed by the combustible gases or gaseous mixtures per pound of glass fiberized broadly ranges from about 200 to about 1500 BTU's per pound of glass fiberized and typically about 400 to about 600 BTU's per pound of glass fiberized. With the method of the present invention, preferably, about 60% to about 75% of the BTU's are consumed by the combustion of the combustible gas or gaseous mixture from the first manifold 52 and about 25% to about 40% of the BTU's are consumed by the combustion of the combustible gas or gaseous mixture from the second manifold 56.

As the fibers issuing from the fiberizing holes 42 pass outward through the heated fiber attenuation zone, the products of combustion from the combustion of the combustible gases or gaseous mixtures discharged from the first and second manifolds 52 and 56 and the high velocity curtain of gaseous fluid from the gaseous fluid discharge ring assembly 28 pull on and attenuate the fibers. After the fibers pass from the heated fiber attenuation zone, the high velocity curtain of gaseous fluid, preferably, solidifies the fibers and redirects the fibers downward for collection.

In a preferred method, the diameters of the fiberizing holes 42 from the uppermost row 44 to the lowermost row 46 are decreased, taking into account the differing viscosity of the fiberizable material at different row heights due to temperature variations in the fiberizable material, so that a decrease in the mass flow rate of the thermoplastic fiberizable material (e.g. glass) per fiberizing hole in a particular row relative the mass flow rate per fiberizing hole in the uppermost row 44 corresponds generally to a decrease in momentum of the fiber attenuation forces from the combustion products and the annular gaseous fluid curtain at a height of the particular row to the momentum of fiber attenuation forces from the combustion products and the annular gaseous fluid curtain at a height of the uppermost row 44. The added heat and fiber attenuation forces provided the heated fiber attenuation zone by the combustion products from the combustion of the combustible gases or gaseous mixtures from the first and second manifolds 52 and 56 and the regulation of the mass flow rate of fiberizable material passing through the fiberizing holes 42 in the different rows of fiberizing holes to generally correspond to the decrease in momentum of the fiber attenuation forces from the combustion products of the combustible gases or gaseous mixtures from the first and second manifolds 52 and 56 and the gaseous fluid curtain at the level of the rows both contribute to improved fiber creation.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An apparatus for producing fibers from a molten thermoplastic fiberizable material comprising:

a fiberizing disk having a bottom wall and an annular peripheral sidewall integral with and extending upward from a periphery of the bottom wall; the annular sidewall having a plurality of annular, horizontally extending rows of fiberizing holes therein through which a molten thermoplastic fiberizable material is passed to fiberize the molten thermoplastic fiberizable material; the plurality of annular rows of fiberizing holes having an uppermost row of fiberizing holes and a lowermost row of fiberizing holes;

means for supplying a molten thermoplastic fiberizable material to the bottom wall of the fiberizing disk radially inward of the annular peripheral sidewall;

means for rotating the fiberizing disk to cause a molten thermoplastic fiberizable material supplied to the bottom wall of the fiberizing disk to flow outward to the annular sidewall, up the annular sidewall, and outward through the fiberizing holes in the annular sidewall in a generally horizontal direction to form fibers;

a first annular manifold means for supplying a combustible gas or gaseous mixture to the fiberizing disk, internally of the annular sidewall, for combustion of the combustible gas or gaseous mixture externally of the first manifold means and within the fiberizing disk to form products of combustion and to help maintain the fiberizing disk and a molten thermoplastic fiberizable material supplied to the fiberizing disk within a desired temperature range for fiberization;

a second annular manifold means for supplying a combustible gas or gaseous mixture externally of the fiberizing disk, for combustion of the combustible gas or gaseous mixture externally of the second manifold means and the fiberizing disk, to produce products of combustion to heat an annular fiber attenuation zone which is concentrically located relative to and extends outward from the annular sidewall of the fiberizing disk from a height of the uppermost row of fiberizing holes to a height of the lowermost row of fiberizing holes and to attenuate within the annular fiber attenuation zone, along with the products of combustion from the first manifold means, fibers formed by the fiberizing disk; and a gaseous fluid discharge ring concentrically positioned relative the fiberizing disk and spaced outwardly from the annular sidewall of the fiberizing disk; the gaseous fluid discharge ring having means for discharging a high velocity annular curtain of gaseous fluid in a downward direction from a height equal to or above the uppermost row of fiberizing holes to help attenuate fibers formed by the fiberizing disk in the heated annular fiber attenuation zone and redirect the fibers that have passed through the heated annular fiber attenuation zone for collection.

2. The apparatus for producing fibers from a molten thermoplastic fiberizable material according to claim 1, wherein:

diameters of the fiberizing holes in the plurality of rows of fiberizing holes decrease from the uppermost row of fiberizing holes to the lowermost row of fiberizing holes.

3. The apparatus for producing fibers from a molten thermoplastic fiberizable material according to claim 1, wherein:

the diameters of the fiberizing holes from the uppermost row of fiberizing holes to the lowermost row of fiberizing holes are decreased so that a decrease in the mass flow rate of thermoplastic fiberizable material per fiberizing hole in a particular row relative to the mass flow rate per fiberizing hole in the uppermost row of fiberizing holes corresponds generally to a decrease in momentum of the combustion products from the combustion of the combustible gases or gaseous mixtures from the first and second manifold means and the annular gaseous fluid curtain at a height of the particular row to the momentum of the combustion products from the combustion of the combustible gases or gaseous mixtures from the first and second manifold means and the annular gaseous fluid curtain at a height of the uppermost row of fiberizing holes.

4. The apparatus for producing fibers from a molten thermoplastic fiberizable material according to claim 1, wherein:

the first manifold means and the second manifold means are part of a heat shield located above and concentrically relative to the fiberizing disk.

5. The apparatus for producing fibers from a molten thermoplastic fiberizable material according to claim 1, wherein:

combustible gas or gaseous mixture supplies for the first manifold means and the second manifold means are separate from each other.

6. A method for producing fibers from a molten thermoplastic fiberizable material comprising:

providing a fiberizing disk having a bottom wall and an annular peripheral sidewall integral with and extending upward from a periphery of the bottom wall; the annular sidewall having a plurality of annular, horizontally extending rows of fiberizing holes therein through which a molten thermoplastic fiberizable material is passed to fiberize the molten thermoplastic fiberizable material; the plurality of annular rows of fiberizing holes having an uppermost row of fiberizing holes and a lowermost row of fiberizing holes;

supplying a molten thermoplastic fiberizable material to the bottom wall of the fiberizing disk radially inward of the annular peripheral sidewall;

rotating the fiberizing disk to cause the molten thermoplastic fiberizable material supplied to the bottom wall of the fiberizing disk to flow outward to the annular sidewall, up the annular sidewall, and outward through the fiberizing holes in the annular sidewall in a generally horizontal direction to form fibers;

supplying a combustible gas or gaseous mixture through a first manifold to the fiberizing disk internally of the annular sidewall; burning the combustible gas or gaseous mixture externally of the first manifold and within the fiberizing disk; forming products of combustion through the burning of the combustible gas or gaseous mixture; and helping maintain the fiberizing disk and the molten thermoplastic fiberizable material supplied to the fiberizing disk within a desired temperature range for fiberization through the burning of the combustible gas or gaseous mixture;

supplying a second combustible gas or gaseous mixture through a second manifold; burning the combustible gas or gaseous mixture from the second manifold externally of the second manifold and the fiberizing disk; forming products of combustion from the burning of the combustible gas or gaseous mixture from the second manifold; heating an annular fiber attenuation zone which is concentrically located relative to and extends outward from the annular sidewall of the fiberizing disk from a height of the uppermost row of fiberizing holes to a height of the lowermost row of fiberizing holes with the products of combustion from the burning of the combustible gases or gaseous mixtures from the first and second manifolds; and attenuating within the annular fiber attenuation zone, with the products of combustion from the burning of the combustible gases or gaseous mixtures from the first and second manifolds, fibers formed by the fiberizing disk; and positioning a gaseous fluid discharge ring concentrically relative the fiberizing disk and spaced outwardly from the annular sidewall of the fiberizing disk; discharging a high velocity annular curtain of gaseous fluid in a downward direction from the gaseous fluid discharge ring at a height equal to or above the uppermost row of fiberizing holes to help attenuate fibers in the heated annular fiber attenuation zone and redirect, downward for collection, the fibers formed by the fiberizing disk that have passed through the heated annular fiber attenuation zone.

7. The method for producing fibers from a molten thermoplastic fiberizable material according to claim 6, wherein:

diameters of the fiberizing holes in the plurality of rows of fiberizing holes decrease from the uppermost row of fiberizing holes to the lowermost row of fiberizing holes.

8. The method for producing fibers from a molten thermoplastic fiberizable material according to claim 6, wherein:

diameters of the fiberizing holes from the uppermost row of fiberizing holes to the lowermost row of fiberizing holes are decreased so that a decrease in the mass flow rate of thermoplastic fiberizable material per fiberizing hole in a particular row of fiberizing holes relative to the mass flow rate per fiberizing hole in the uppermost row of fiberizing holes corresponds generally to a decrease in momentum of the combustion products from the combustion of the combustible gases or gaseous mixtures from the first and second manifolds and the annular gaseous fluid curtain at a height of the particular row of fiberizing holes to the momentum of the combustion products from the combustion of the combustible gases or gaseous mixtures from the first and second manifolds and the annular gaseous fluid curtain at a height of the uppermost row of fiberizing holes.

9. The method for producing fibers from a molten thermoplastic fiberizable material according to claim 6, wherein:

the first manifold and the second manifold are part of a heat shield located above and concentrically relative to the fiberizing disk.

10. The method for producing fibers from a molten thermoplastic fiberizable material according to claim 6, wherein:

the combustible gases or gaseous mixtures are supplied separately to the first manifold and the second manifold.

11. The method for producing fibers from a molten thermoplastic fiberizable material according to claim 6, wherein:

the total energy consumed by the combustion of the combustible gases or gaseous mixtures from the first and second manifolds is between about 200 and about 1,500 BTU's per pound of thermoplastic fiberizable material fiberized.

12. The method for producing fibers from a molten thermoplastic fiberizable material according to claim 11, wherein:

the combustion of the combustible gas or gaseous mixture from the first manifold within the fiberizing disk accounts for about 60% to about 75% of the BTU's and the combustion of the combustible gas or gaseous mixture from the second manifold externally of the fiberizing disk accounts for about 25% to about 40% of the BTU's provided by the combustible gases or gaseous mixtures.

13. The method for producing fibers from a molten thermoplastic fiberizable material according to claim 12, wherein:

the velocity of the combustion products entering the annular heated attenuation zone from the combustion of the combustible gases or gaseous mixtures from the first and second manifolds is between about 60 feet per second and about 400 feet per second.

14. The method for producing fibers from a molten thermoplastic fiberizable material according to claim 12, wherein:

the velocity of the combustion products entering the annular heated attenuation zone from the combustion of the combustible gases or gaseous mixtures from the first and second manifolds is between about 100 feet per second and about 200 feet per second.

15. The method for producing fibers from a molten thermoplastic fiberizable material according to claim 14, wherein:

the velocity of the gaseous fluid curtain exiting the gaseous fluid discharge ring is about 1,000 feet per second or higher.

16. The method for producing fibers from a molten thermoplastic fiberizable material according to claim 15, wherein:

the gaseous fluid forming the gaseous fluid curtain is air.

17. The method for producing fibers from a molten thermoplastic fiberizable material according to claim 6, wherein:

diameters of the fiberizing holes in the plurality of rows of fiberizing holes decrease from the uppermost row of fiberizing holes to the lowermost row of fiberizing holes; and the velocity of the combustion products entering the annular heated attenuation zone from the combustion of the combustible gases or gaseous mixtures from the first and second manifolds is between about 60 feet per second and about 400 feet per second.

18. The method for producing fibers from a molten thermoplastic fiberizable material according to claim 17, wherein:

the velocity of the gaseous fluid curtain exiting the gaseous fluid discharge ring is about 1,000 feet per second or higher.

19. The method for producing fibers from a molten thermoplastic fiberizable material according to claim 17, wherein:

the velocity of the combustion products entering the annular heated attenuation zone from the combustion of the combustible gases or gaseous mixtures from the first and second manifolds is between about 100 feet per second and about 200 feet per second.

20. The method for producing fibers from a molten thermoplastic fiberizable material according to claim 19, wherein:

the velocity of the gaseous fluid curtain exiting the gaseous fluid discharge ring is about 1,000 feet per second or higher.

21. The method for producing fibers from a molten thermoplastic fiberizable material according to claim 17, wherein:

the gaseous fluid forming the gaseous fluid curtain is air.

22. The method for producing fibers from a molten thermoplastic fiberizable material according to claim 17, wherein:

the total energy consumed by the combustion of the combustible gases or gaseous mixtures from the first and second manifolds is between about 200 and about 1,500 BTU's per pound of thermoplastic fiberizable material fiberized.

23. The method for producing fibers from a molten thermoplastic fiberizable material according to claim 22, wherein:

the combustion of the combustible gas or gaseous mixture from the first manifold within the fiberizing disk accounts for about 60% to about 75% of the BTU's and the combustion of the combustible gas or gaseous mixture from the second manifold externally of the fiberizing disk accounts for about 25% to about 40% of the BTU's provided by the combustible gases or gaseous mixtures.

24. The method for producing fibers from a molten thermoplastic fiberizable material according to claim 6, wherein:

the velocity of the combustion products entering the annular heated attenuation zone from the combustion of the combustible gases or gaseous mixtures from the first and second manifolds is between about 60 feet per second and about 400 feet per second.

25. The method for producing fibers from a molten thermoplastic fiberizable material according to claim 24, wherein:

the velocity of the gaseous fluid curtain exiting the gaseous fluid discharge ring is about 1,000 feet per second or higher.

26. The method for producing fibers from a molten thermoplastic fiberizable material according to claim 6, wherein:

the velocity of the combustion products entering the annular heated attenuation zone from the combustion of the combustible gases or gaseous mixtures from the first and second manifold is between about 100 feet per second and about 200 feet per second.

27. The method for producing fibers from a molten thermoplastic fiberizable material according to claim 26, wherein:

the velocity of the gaseous fluid curtain exiting the gaseous fluid discharge ring is about 1,000 feet per second or higher.

28. The method for producing fibers from a molten thermoplastic fiberizable material according to claim 26, wherein:

the gaseous fluid forming the gaseous fluid curtain is air.

29. The method for producing fibers from a molten thermoplastic fiberizable material according to claim 26, wherein:

the total energy consumed by the combustion of the combustible gases or gaseous mixtures from the first and second manifolds is between about 200 and about 1,500 BTU's per pound of thermoplastic fiberizable material fiberized.

* * * * *